US007892317B2

(12) United States Patent
Rahman Nia

(10) Patent No.: US 7,892,317 B2
(45) Date of Patent: Feb. 22, 2011

(54) PREPARATION OF COLLOIDAL NANOSILVER

(76) Inventor: Jafar Rahman Nia, Motahari, Shekarabi, # 10, Suite 13, Tehran, Tehran (IR)

( * ) Notice: Subject to any disclaimer, the term of this patent is extended or adjusted under 35 U.S.C. 154(b) by 275 days.

(21) Appl. No.: 11/775,908

(22) Filed: Jul. 11, 2007

(65) Prior Publication Data

US 2009/0013825 A1  Jan. 15, 2009

(51) Int. Cl.
*B22F 9/24* (2006.01)
(52) U.S. Cl. .......................................... 75/371; 75/741
(58) Field of Classification Search ........................ None
See application file for complete search history.

(56) References Cited

U.S. PATENT DOCUMENTS

| | | | |
|---|---|---|---|
| 4,155,810 A * | 5/1979 | Kitajima et al. ............. 435/130 |
| 6,379,712 B1 | 4/2002 | Yan et al. | |
| 6,537,344 B2 | 3/2003 | Mukherjee et al. | |
| 6,544,427 B2 | 4/2003 | Layton | |
| 6,562,403 B2 | 5/2003 | Klabunde et al. | |
| 6,572,673 B2 | 6/2003 | Lee et al. | |
| 6,660,058 B1 | 12/2003 | Oh et al. | |
| 6,720,006 B2 | 4/2004 | Hanke et al. | |
| 6,743,348 B2 | 6/2004 | Holladay et al. | |
| 6,979,491 B2 | 12/2005 | Yan et al. | |
| 7,138,468 B2 | 11/2006 | McCormick et al. | |
| 7,318,904 B2 * | 1/2008 | Wang et al. ................. 252/512 |
| 2008/0064767 A1 * | 3/2008 | Chou et al. ................... 516/97 |

OTHER PUBLICATIONS

Zhou, Guangjun et al., "Surfactant-assisted synthesis and characterization of silver nanorods and nanowires by an aqueous solution approach", Journal of Crystal Growth, vol. 289, pp. 255-259, Jan. 18, 2006.*

* cited by examiner

*Primary Examiner*—George Wyszomierski
(74) *Attorney, Agent, or Firm*—Barry Choobin; Choobin & Choobin Consultancy L.L.P

(57) ABSTRACT

In present invention, colloidal nanosilver has been prepared with high affect on bacteria, viruses, and fungi. The average size of nano particles are less than 10 nm. In the present invention colloidal nanosilver is subject to synthesis by a very simple method and in a short time. Nanosilver colloid prepared by use of different surfactant like LABS, Tween 20, Tween 60, Tween 80, SDS.

10 Claims, 2 Drawing Sheets

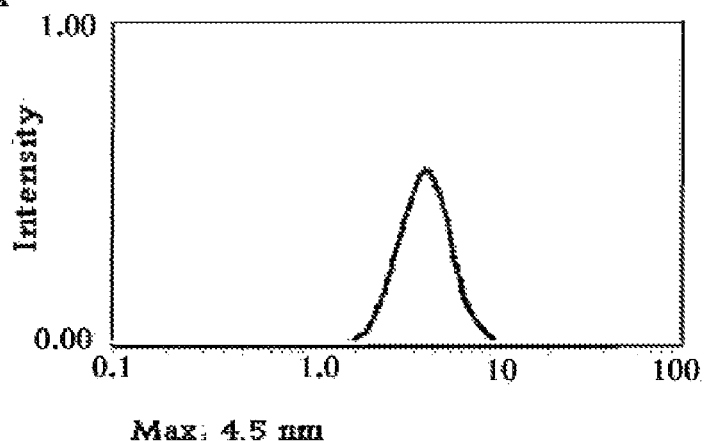
FIG. 2.A
Max: 4.5 nm
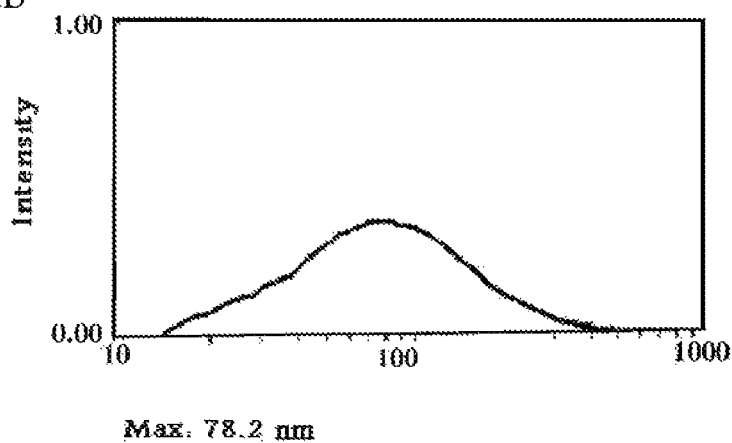
FIG. 2.B
Max: 78.2 nm
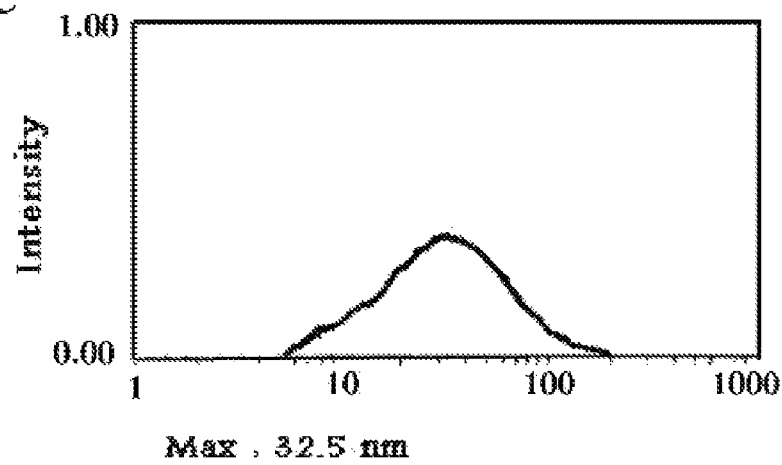
FIG. 2.C
Max: 32.5 nm

PREPARATION OF COLLOIDAL NANOSILVER

SPONSORSHIP STATEMENT

The present invention is sponsored by Iranian National Science foundation (INSF).

FIELD OF THE INVENTION

Present invention relates to nanotechnology, in particular the present invention relates to a method for preparation for silver nano particles having a well controlled size in a surfactant solution.

BACKGROUND OF THE INVENTION

Nano technology is the study and treatment of substance and material in a nano meter range. Nanometer equals to $10^{-9}$ meter. The internationally acclaimed range for research and study for the nano technology is between 0.1 nm and 100 nm. The technology has been used in medicine including drug carrier, cell dye, cell separation, clinical diagnosis, and disinfection.

When, compared with conventional metal micro particles, metal nano particles exhibit excellent qualities such as increased surface-to-volume ratio, elevated surface energy, increased ductility after pressure loading, higher hardness, larger specific heat and the like (C. Suryanarayana, P. R. Froes, Metallurgical Transactions A 1992, 23,1071).

Nano particle are extremely important materials with utility in different areas ranging from nanotechnology, non-linear optics, diode lasers smart sensors, markers in drugs, gene sequencing to catalysts. Therefore, the applicability of metal Nano particles receives the extensive interest of the material—directed industry and science. For example, catalytic reaction in which an advantage of high conversion ratio on the catalytic reaction of unsaturated hydrocarbon is noted especially (L. N. lewis, Chem., Rev. 1993, 93, 2693). Metal nano particles have wide applications in different industries like agricultural, poultry and livestocks, textile, polymer, etc.

Metal including silver, copper, mercury, and zinc are known for antibacterial properties. Bacteria treated by these metals do not acquire resistance to the metals. Therefore, the bacterial metals have advantages over the conventional antibiotics which often cause the selection of antibiotic resistant microorganism.

Attempts have been made in the prior art to produce silver-based solution, including colloidal silver, some of which have been more successful than others. Many of the presently available silver-based products, however, are unstable and lose the silver to precipitation. A true colloid operates to maintain the colloidal particles in suspension over a period of several years, and perhaps indefinitely.

Conventionally, silver nano particle have been prepared by various methods such as co-precipitation methods in aqueous solution, electrochemical methods, aerosol, reverse micro emulsion, chemical liquid deposition, photochemical reduction, chemical reduction in solution and UV irradiation. But all of these methods have limitation in controlling the particle size and production of particles on an industrial scale. To overcome these limitations, recently, surfactants, have been used (WO99/43427).

There are also many methods for the preparation of nano-size colloidal metal particles. For example U.S. Pat. No. 6,572,673 disclosed a process for preparing metal nano particles, comprising reacting suitable metal salt and anionic surfactant containing an anionic group of carboxylic group, sulphate group, or sulfonate group as reducing agent in water under reflux at a temperature of 50-140° C.

U.S. Pat. No. 6,979,491 disclosed that nano particles are prepared without the use of ammonia or ammonia water. The antimicrobial yarn is preferably used in making cloth particularly for treatment of patients with burns or wounds.

U.S. Pat. No. 6,660,058 disclosed the preparation of silver alloyed with other elements such as platinum (Pt), palladium (pd), gold (Au) aluminum (AI), cadmium (Cd), and sulfur (S) in surfactant solution. Therefore, it would be advantageous to provide a method for making the colloid nano Silver very simple, fast, and easy to carry over.

SUMMARY OF THE INVENTION

It is an object of the present invention to provide a simple preparation method for silver nano particles having a well-controlled size in a surfactant solution. The nano silver colloid is prepared by the following steps—wise procedure: (1) dissolving silver nitrate crystal in distilled water; (2) adding surfactant, LABS (Linear alkyl benzene sulfonate) to the solution and; (3) adding reducing agent to the solution. The preferred reducing agent is hydrazine.

Additionally, the present invention provides methods of using the nano silver colloid. The nano silver colloid can be used in a variety of health care, medicinal, and industrial products.

BRIEF DESCRIPTION OF THE DRAWINGS

The invention, as well as its many advantages, maybe further understood by the following detailed description and drawing in which:

FIG. 2(A) to 2(C) shows particle size distributions of silver particle prepare in different surfactants.

FIG. 2 (A) shows LABS, which is an anionic surfactant.

FIG. 2 (B) shows SDS, which is an anionic surfactant.

FIG. 2 (C) shows polysorbate 20 (Tween 20), which is a nonionic surfactant.

DETAILED DESCRIPTION OF THE PREFERRED EMBODIMENT

Figure 1:
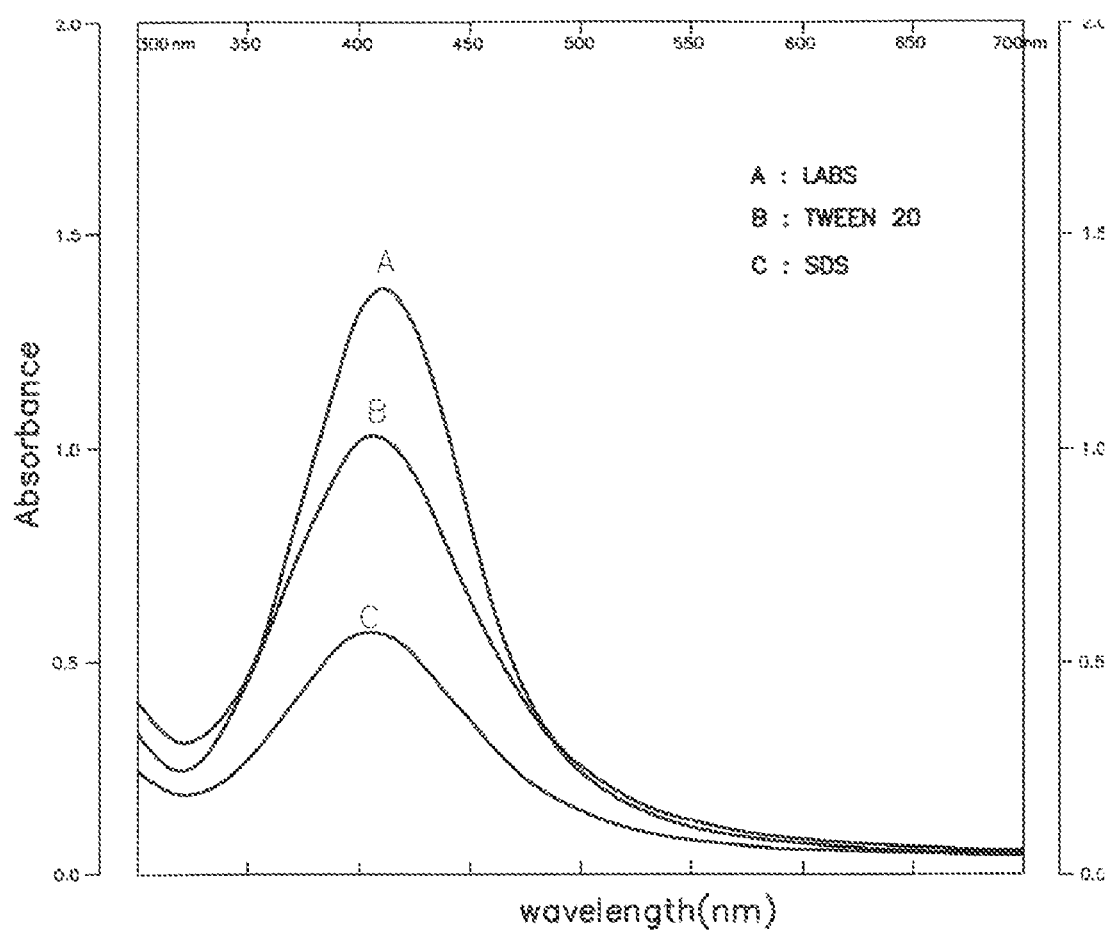
FIG. 1 shows UV absorbance of silver particle prepared in presence of different surfactants.

As described above, the invention provides a process for preparing metal nano particles by using anionic and nonionic surfactant and suitable metal salt and a reducing agent, the metal salt can be effectively reduced into metal nano particles having a uniform particle size.

Suitable surfactant useful in the process according to the invention are LABS (linear alkyl benzene sulfonate), tween 20 (polysorbate 20). Tween 60 (polysorbate 60), Tween 80 (polysorbate 80), SDS (sodium dodecyl sulfate). That the best result was for LABS.

Generally, the amount or concentration of the surfactant used in the invention can be, but is not limited to 0.05-20 wt. % preferably; the amount is 2-5 wt %.

Suitable reducing agents useful in the process according to the invention are hydrazine, $NaBH_4$, $LiBH_4$, Glucose. The best result was for hydrazine.

Generally, the amount or concentration of the hydrazine used in the invention can be, but is not limited to $1 \times 10^{-5}$-10 g. preferably, the amount is $3 \times 10^{-4}$-5×10-3 g.

This nano silver colloid is prepared at room temperature and reaction time is 1 hour, and it is possible to synthesis this colloid in shorter time. The process for preparing metal nano particles according to the invention exhibits several following advantages:

a) Controlling the size of nano particles by a simple method.

b) Easy to use and no need for particular speciality.

c) Wide application.

d) Minimum side effects on the body.

e) It is a strong insecticide against microbes.

f) Stable compounds.

g) The smallest particles (nano) size.

h) Short time for synthesis.

i) Using aqueous solvent instead of organic solvent.

The process of the invention is described herein below with reference to the following examples, which are illustrative and should not be construed as limiting the scope of the invention.

Example 1

The 4.5 g LABS (Linear alkyl benzene sulfonate) was dissolved in 95 ml of distilled water and then was added into a solution containing 0.32 g of silver nitrate. After mixing thoroughly, 0.2 g of hydrazine solution (0.03 M) was added in to the solution, a yellowish silver colloidal solution was formed. The UV-V is spectrum of the reaction solution revealed an absorption band at about 415 nm that is the characteristic absorption band of the nano silver particle. Dynamic light scattering result of the reaction solution, as shown in FIG. 2 (A), show the average particle size is 4.5 nm.

Example 2

The same procedure as in example 1 was repeated except the 4.5 g LABS was replaced with 4.5 g SDS (sodium dodecyle sulfate). The UV spectra of the obtained nano silver colloidal solution is as shown in FIG. 1, and the average particle size were 78.2 nm, as shown in FIG. 2 (B).

Example 3

Tween 20 (polysorbate 20) was used in place of LABS in example 1. The UV-spectra of the obtained nano silver colloidal solution is as shown in FIG. 1 and the average particle size was 32.5 nm, as shown in FIG. 2(C).

Example 4

The colloidal nano silver prepared in example 1-3 was examined to determine the antimicrobial activity of the colloid.

1—Providing sterile culture medium of NA and pouring a plate of it.

2—Providing microbial suspension of E-coli bacteria standard soosh (ATCC25922) to McFarland method that it is concentration is $15^8$ cfu/ml.

3—Providing a microbial suspension with concentration of $10^5$ from the above suspension.

4—Mixing ⅓ nanosilver colloid and ⅔ of provided bacteria.

5—Culturing of mixing material in previous step on NA culture medium.

6—Putting the plates in the Incubator in 25° C. for 24 hours.

7—After 24 hours, one loop is taken from those plates and put on a new medium of NA.

8—After 24 hours being in Incubator, these plates are checked for colony count of bacteria.

Results:

No colony or string of any microbial growth was observed on the plate of experimental group.

Many changes and modification in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A process for synthesis of a silver nano particle, the process consisting of: reacting a silver salt and an anionic surfactant and a reducing agent in water at a room temperature; thereby reducing said silver salt into silver nano particles having a uniform particle size, wherein the uniform particle size of said silver nano particles is less than 4.5 nanometers.

2. The process according to claim 1, wherein said anionic surfactant, is a linear alkyl benzene sulfonate (LABS).

3. The process according to claim 1, wherein said reducing agent comprises hydrazine, NaBH4, LiBH4, or Glucose.

4. The process according to claim 3, wherein said reducing agent comprises hydrazine.

5. The process according to claim 1, wherein said reaction is performed in 1 hour.

6. The process according to claim 1, wherein said reaction is performed in less than 1 hour.

7. The process according to claim 1, wherein said synthesis of silver nanoparticle is done in aqueous solution.

8. The process according to claim 1, wherein said anionic surfactant, is present in 0.050-20 wt %.

9. The process according to claim 1, wherein said reducing agent is present in $3 \times 10^{-4}$-$5 \times 10^{-3}$ grams.

10. The process according to claim 1, wherein said silver salt is present in 0.0032-128 grams.

* * * * *